United States Patent
Eastlake, III (10) Patent No.: US 12,244,745 B2
(45) Date of Patent: Mar. 4, 2025

(54) METHOD FOR IMPROVED HASH CHAINING AUTHENTICATION

(71) Applicant: HUAWEI TECHNOLOGIES CO., LTD., Shenzhen (CN)

(72) Inventor: Donald E. Eastlake, III, Apopka, FL (US)

(73) Assignee: Huawei Technologies Co., Ltd., Shenzhen (CN)

(*) Notice: Subject to any disclaimer, the term of this patent is extended or adjusted under 35 U.S.C. 154(b) by 25 days.

(21) Appl. No.: 18/356,741

(22) Filed: Jul. 21, 2023

(65) Prior Publication Data

US 2023/0362023 A1 Nov. 9, 2023

Related U.S. Application Data

(63) Continuation of application No. PCT/US2022/013402, filed on Jan. 21, 2022.

(60) Provisional application No. 63/140,677, filed on Jan. 22, 2021.

(51) Int. Cl.

| | |
|---|---|
| *H04L 9/00* | (2022.01) |
| *H04L 9/08* | (2006.01) |
| *H04L 9/32* | (2006.01) |
| *H04L 61/5092* | (2022.01) |
| *H04L 101/622* | (2022.01) |

(52) U.S. Cl.
CPC ............ *H04L 9/50* (2022.05); *H04L 9/0869* (2013.01); *H04L 9/3213* (2013.01); *H04L 61/5092* (2022.05); *H04L 2101/622* (2022.05)

(58) Field of Classification Search
None
See application file for complete search history.

(56) References Cited

U.S. PATENT DOCUMENTS

| | | | | |
|---|---|---|---|---|
| 8,224,754 | B2* | 7/2012 | Pastusiak | G06Q 30/0207 705/14.1 |
| 9,172,698 | B1* | 10/2015 | Evans | H04L 63/0853 |
| 11,190,358 | B2* | 11/2021 | Bettger | G06F 21/64 |
| 11,683,182 | B2* | 6/2023 | Gray | H04L 9/088 713/181 |
| 12,021,998 | B2* | 6/2024 | Bettger | G06F 21/64 |

(Continued)

OTHER PUBLICATIONS

Droms, R., "Dynamic Host Configuration Protocol," Network Working Group, RFC 2131, Mar. 1997, 45 pages.

(Continued)

*Primary Examiner* — Lashonda Jacobs-Burton
(74) *Attorney, Agent, or Firm* — Conley Rose, P.C.

(57) ABSTRACT

A method for improving communication security implemented by a sending device. The method includes the sending device generating a first hash token based on a K generation hash ($H_K$) value of a seed known only to the sending device, where K is an integer value greater than one, and sending a first message that includes the first hash token. The method further includes the sending device performing a reversible combination of a K−1 generation hash ($H_{K-1}$) value of the seed and a hash of the first message to generate a second hash token, and sending the second message that includes the second hash token.

20 Claims, 4 Drawing Sheets

(56) References Cited

U.S. PATENT DOCUMENTS

| | | | | |
|---|---|---|---|---|
| 2007/0113083 | A1* | 5/2007 | Volkovs | H04L 9/3242 713/168 |
| 2009/0089266 | A1* | 4/2009 | Gollapudi | G06F 16/24539 |
| 2014/0173682 | A1 | 6/2014 | Liang et al. | |
| 2021/0351932 | A1* | 11/2021 | Gray | H04L 9/0643 |
| 2023/0362022 | A1* | 11/2023 | Eastlake, III | H04L 9/3239 |

OTHER PUBLICATIONS

Eastlake, D., III, et al., "Randomness Requirements for Security," Network Working Group, RFC 4086, Jun. 2005, 48 pages.

Eastlake, D., III, et al., "IANA Considerations and IETF Protocol and Documentation Usage for IEEE 802 Parameters," Internet Engineering Task Force (IETF), RFC 7042, Oct. 2013, 27 pages.

Mrugalski, T., et al., "Dynamic Host Configuration Protocol for IPv6 (DHCPv6)," Internet Engineering Task Force (IETF), RFC 8415, Nov. 2018, 154 pages.

Volz, B., et al., "Link-Layer Address Assignment Mechanism for DHCPv6," Internet Engineering Task Force (IETF), RFC 8947, Dec. 2020, 18 pages.

Bernardos, CJ., et al., "Structured Local Address Plan (SLAP) Quadrant Selection Option for DHCPv6," Internet Engineering Task Force (IETF), RFC 8948, Dec. 2020, 13 pages.

De La Olivia, A., et al., "Protocol for Assignment of Local and Multicast Addresses (PALMA)," Interdigital, UC3M, IEEE 802.1CQ, Jun. 30, 2022, 18 pages.

Lamport, L., "Password Authentication with Insecure Communication," SRI International, Communications of the ACM. vol. 24, No. 11, Nov. 1981, 3 pages.

"Federal Information Processing Standards Publication Secure Hash Standard (SHS)," FIPS PUB 180-4, Information Technology Laboratory National Institute of Standards and Technology Gaithersburg, MD 20899-8900, Aug. 2015, 36 pages.

Hu, C.H., et al., "Efficient Constructions for One-way Hash Chains," ACNS 2005, LNCS 3531, pp. 423-441.

Zhao, Y., et al., "An Improved Elegant Method to Re-initialize Hash Chains," Department of Information Engineering, Beijing University of Posts and Telecommunications, Jan. 18, 2005, 8 pages.

"Information Technology—Open Systems Interconnection—Base Reference Model: The Basic Model" ISO/IEC 7498-1, Second Edition Nov. 15, 1994, 6 pages.

"T/Key: Second-Factor Authentication From Secure Hash Chains," arXiv:1708/08424v1, CCS '17, Oct. 30-Nov. 3, 2017, 17 pages.

* cited by examiner

METHOD FOR IMPROVED HASH CHAINING AUTHENTICATION

CROSS-REFERENCE TO RELATED APPLICATION

This application is a continuation of International Patent Application No. PCT/US2022/013402 filed on Jan. 21, 2022, by Futurewei Technologies, Inc., and titled "Method for Improved Hash Chaining Security," which claims the benefit of U.S. Provisional Patent Application No. 63/140,677 filed on Jan. 22, 2021, by Futurewei Technologies, Inc., and titled "Hash Chaining Improvements." The aforementioned applications are incorporated by reference in their entireties.

TECHNICAL FIELD

The present disclosure is generally related to network communications, and in particular to various embodiments of systems and methods that improve hash chaining security.

BACKGROUND

A hash function is a function that can be used to map data of variable-length size to fixed-size values that are infeasible to invert. The values returned by a hash function are called hash values, hash codes, digests, or simply hashes. It is common for the length of the output of a hash function to be a multiple of 8-bit bytes since modern computers are typically more efficient at processing 8-bit bytes or multiples thereof. Hash chains, that is a series of values produced by iterating a hash function, can be used to authenticate the source of a series of messages and the correct receipt of a previous message.

SUMMARY

A first aspect relates to a method for improving communication security implemented by a sending device. The method includes the sending device generating a first hash token based on a K generation hash ($H_K$) value of a seed known only to the sending device, where K is an integer value greater than one, and sending a first message that includes the first hash token. The method includes the sending device performing a reversible combination of a K−1 generation hash ($H_{K-1}$) value of the seed and a hash of the first message to generate a second hash token, and sending a second message that includes the second hash token.

Optionally, in a first implementation according to the first aspect, the method further includes the sending device performing an exclusive-or (XOR) operation between the K−1 generation hash ($H_{K-1}$) value of the seed and the hash of the first message to generate the second hash token.

Optionally, in a second implementation according to the first aspect or any implementation thereof, the reversible combination of the K−1 generation hash ($H_{K-1}$) value of the seed, and the hash of the first message can only be reversed using the K generation hash ($H_K$) value and knowledge of the first message or the hash of the first message.

Optionally, in a third implementation according to the first aspect or any implementation thereof, the method further includes the sending device generating a third hash token based on a K−2 generation hash ($H_{K-2}$) value of the seed, and a hash of the second message; and sending a third message that includes a third hash token formed by a reversible combination of that K−2 generation hash and the hash of the second message.

A second aspect relates to a method for improving communication security implemented by a receiving device. The method includes the receiving device receiving a first message ($M_N$) that includes a first hash token based on a K generation hash ($H_K$) value of a seed, where K is an integer value greater than one, and storing the $H_K$ value and at least one of the first message ($M_N$) or hash of the first message ($H(M_N)$). The method also includes the receiving device receiving a second message ($M_{N+1}$) that includes a second hash token based on a reversible combination of a K−1 generation hash ($H_{K-1}$) value of the seed, and a hash of the first message. The method further includes the receiving device reversing the reversible combination using the stored first message ($M_N$) or stored hash of the first message ($M_N$) to determine the K−1 generation hash ($H_{K-1}$) value from the second hash token; determining whether a hash value of the hash of the K−1 generation ($H(H_{K-1})$) value is equal to the $H_K$ value; and authenticating the second message ($M_{N+1}$) was sent by a sending device that sent the first message ($M_N$) when the hash of the K−1 generation ($H(H_{K-1})$) value is equal to the $H_K$ value.

Optionally, in a first implementation according to the second aspect, the method further includes the receiving device verifying the first message ($M_N$) was received complete and unaltered when the hash token in the second message ($M_{N+1}$), after reversing the reversible combination using the stored first message or stored hash of the first message, equals the hash token in the first message.

Optionally, in a second implementation according to the second aspect or any implementation thereof, wherein determining the K−1 generation hash ($H_{K-1}$) value from the second hash token comprises retrieving the stored hash of the first message ($M_N$) or hashing the stored first message ($M_N$) that was received by the receiving device; and performing an exclusive-or (XOR) operation between the stored hash of the first message ($M_N$) or a hash of the stored first message ($M_N$) and the second hash token to determine the K−1 generation hash ($H_{K-1}$) value from the second hash token.

Optionally, in a third implementation according to the second aspect or any implementation thereof, the method further includes the receiving device receiving a third message ($M_{N+2}$) that includes a third hash token based on the reversible combination of a K−2 generation hash ($H_{K-2}$) value of the seed, and a hash of the second message ($M_{N+1}$).

Optionally, in a fourth implementation according to the second aspect or any implementation thereof, the method further includes the receiving device determining the K−2 generation hash ($H_{K-2}$) value from the third hash token; determining whether a hash value of the hash of the K−2 generation ($H(H_{K-2})$) value is equal to the $H_{K-1}$ value; and authenticating the third message ($M_{N+2}$) was sent by the sending device that sent the second message ($M_{N+1}$) when the hash of the K−2 generation ($H(H_{K-2})$) value is equal to the $H_{K-1}$ value.

Optionally, in a fifth implementation according to the second aspect or any implementation thereof, the method further includes the receiving device verifying the second message ($M_{N+1}$) was received complete and unaltered when the hash token in the third message ($M_{N+2}$), after reversing the reversible combination using the stored second message or stored hash of the second message, equals the hash token in the second message.

A third aspect relates to a method for improving communication security implemented by a first device. The method includes the first device receiving a first incoming message from a second device, where the first incoming message includes a first incoming hash token comprising a reversible combination of a J+1 generation hash ($H_{J+1}$) value of a first seed known only to the sender of the first message, and a hash of a last outgoing message, if any, sent by the first device, where J is an integer value greater than one. The method further includes the first device generating a first outgoing hash token based on a reversible combination of a K+1 generation hash ($H_{K+1}$) value of a second seed known only to the first device, and a hash of the first incoming message, where K is an integer value greater than one; and sending a first outgoing message that includes the first outgoing hash token to the second device.

Optionally, in a first implementation according to the third aspect, the method further includes the first device determining the $H_{J+1}$ value of the first seed from the first incoming hash token; and storing the $H_{J+1}$ value for use in authenticating a second incoming message from the second device.

Optionally, in a second implementation according to the third aspect or any implementation thereof, the method further includes the first device receiving the second incoming message from the second device, where the second incoming message includes a second incoming hash token based on the reversible combination of a J generation hash ($H_J$) value of the first seed, and the hash of the first outgoing message.

Optionally, in a third implementation according to the third aspect or any implementation thereof, the method further includes the first device determining the J generation hash ($H_J$) value from the second incoming hash token; determining whether a hash value of the J generation hash ($H_J$) value is equal to the $H_{J+1}$ value; and authenticating the second incoming message was sent by the second device and that the first outgoing message was received complete and unaltered by the second device when the hash value of the J generation hash ($H_J$) value is equal to the $H_{J+1}$ value.

A fourth aspect relates to an apparatus comprising a memory configured to store instructions; and one or more processors coupled to the memory and configured to execute the instructions to cause the apparatus to perform the method according to the first aspect or any implementation thereof.

A fifth aspect relates to an apparatus comprising a memory configured to store instructions; and one or more processors coupled to the memory and configured to execute the instructions to cause the apparatus to perform the method according to the second aspect or any implementation thereof.

A sixth aspect relates to an apparatus comprising a memory configured to store instructions; and one or more processors coupled to the memory and configured to execute the instructions to cause the apparatus to perform the method according to the third aspect or any implementation thereof.

BRIEF DESCRIPTION OF DRAWINGS

To describe the technical solutions in the embodiments of the present disclosure more clearly, the following briefly describes the accompanying drawings for describing the embodiments. It is clear that, the accompanying drawings in the following description show merely some embodiments of the present disclosure, and an ordinary person skilled in the art may derive other drawings from these accompanying drawings.

DESCRIPTION OF EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various embodiments of systems and methods that improve hash chain security for communicating messages. In particular, the disclosed embodiments combine the hash of a previous message or messages into a hash chain token in a reversible manner to provide stronger communication assurances. The hash chain token can be reversibly separated to determine whether a received message was sent by the same sender of a previous message, and whether the previous message was received completely and unaltered.

In general, a goal of hash functions is that the output of a hash function be relatively easy to calculate, but infeasible to invert. For the given equation, H=Hash (X), H is the output of a hash function applied to the bit string X as input. Using a hash function, H is relatively easy to calculate given X. However, it is infeasible to find the bit string X given H. For instance, strong hash functions combine and use all the input bits so typically if even one bit of input is changed, about half the output bits of the hash functions changes. An example of a strong hash function is the Secure Hash Algorithm (SHA) approved by the National Institute of Standards and Technology (NIST).

In addition, a hash function can be applied recursively where the output of a hash can be used as an input of the same hash function. A hash chain is the series of values obtained by repeatedly applying a hash function, so if:

$H_1$=Hash(X)

$H_2$=Hash ($H_1$)=Hash (Hash (X))

and generally $H_N$=Hash ($H_{N-1}$)=Hash (Hash ( . . . (Hash (X)) . . . ))

that is, $H_N$ is the result of applying the function Hash N times recursively, the sequence $H_N, H_{N-1}, \ldots, H_2, H_1$ constitutes a hash chain.

Due to the fact that it is infeasible to find the bit string X given H as described above, a hash chain can be used for authenticating messages from a sending device. For example, referring to FIG. 1, assume that a sending device 100 is configured to send a sequence of messages to a receiving device 102. The receiving device 102 wants to be sure that the messages come from the sending device 100. In an embodiment, based on a prior agreement, configuration, or because both the sending device 100 and the receiving device 102 are utilizing a standard concerning the exchanging of messages or the like, the sending device 100 and the receiving device 102 both know the Hash function to use and how to find the hash token in a message.

Figure 1:
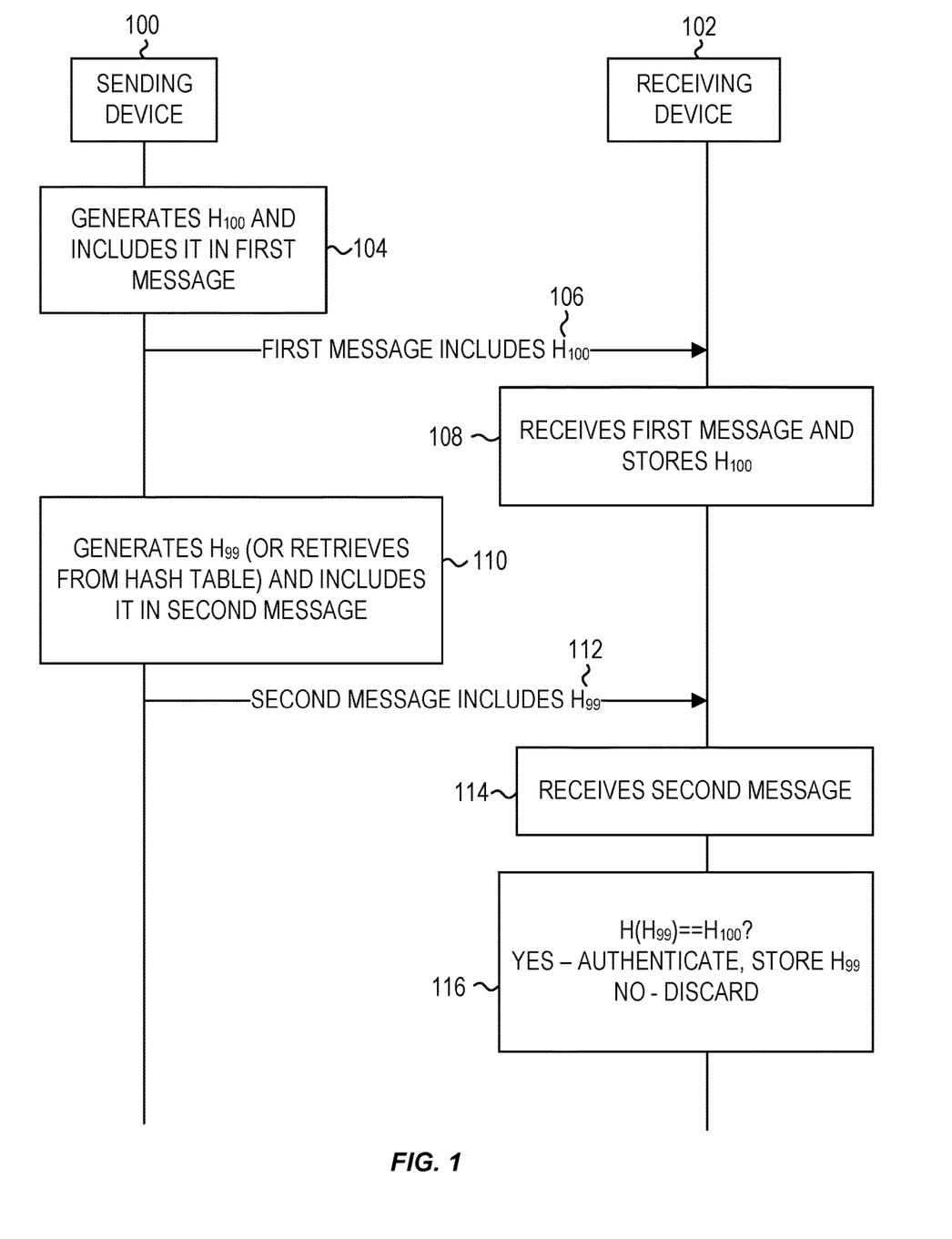
FIG. 1 is a schematic diagram illustrating a hash chaining security process according to an embodiment of the present disclosure.

In an embodiment, at step 104, the sending device 100 starts by creating a random seed S (i.e., a random string of bits) which only the sending device will know and calculates a hash chain. For example, the hash chain can be of size 100, where $H_{100}$ is the result of applying a strong hash function to S one hundred times recursively as described above. The hash chain can be of any size greater than one. The sending device 100 then includes the value of $H_{100}$ in a first message. At step 106, the sending device 100 sends the first message that includes the value of $H_{100}$ to the receiving device 102. The hash value included in the message is referred to herein as a token or a hash token.

At step 108, when the receiving device 102 receives the first message, the receiving device 102 identifies the hash token in the message and stores the value of the hash token (in this case, the value of $H_{100}$) in memory.

When a second message is to be sent to the receiving device 102, the sending device 100, at step 110, has to either recompute the hash chain to obtain the value of $H_{99}$ (i.e., the result of applying the hash function to the seed S ninety-nine times recursively) or retrieve the value of $H_{99}$ from a hash table (if the sending device 100 has enough memory/storage capacity to have stored the results of all 100 hash values from the previous calculations in the hash table). The sending device 100 then includes the value of $H_{99}$ as a hash token in the second message.

At step 112, the sending device 100 sends the second message that includes the value of $H_{99}$ as the hash token to the receiving device 102. At step 114, the receiving device 102 receives the second message. At step 116, the receiving device 102 can verify the hash token by computing the hash of the hash token (i.e., Hash($H_{99}$)) and comparing the resulting value to the value of $H_{100}$ saved by the receiving device 102 from the first message. If the resulting value is the same as the value of $H_{100}$ saved by the receiving device 102 from the first message, then the receiving device 102 is assured that the sending device 100 is the sender of the second message. The receiving device 102 thus authenticates the second message as being sent from the sending device 100 and stores the value of $H_{99}$ for use in authenticating a next message from the sending device 100. If the resulting value is not the same as the value of $H_{100}$ saved by the receiving device 102 from the first message, then the receiving device 102 can discard or ignore the message.

As stated above, it is infeasible to find a value that will yield a particular hash. Thus, even when an adversary that observes the first message sent from the sending device 100 to the receiving device 102, or observes the value that the receiving device 102 has saved, the adversary cannot determine an $H_{99}$ to authenticate a new message. Generally, an adversary cannot learn or guess the original seed S (or, in general, any earlier value in the chain) because the sending device 100 can easily create a random seed S that is infeasible for an adversary to guess by deriving such seeds from a root random quantity with high entropy. Further, it is assumed that an adversary cannot modify messages in transit from the sending device 100 to the receiving device 102 or block such a message and steal an authentication token to use in forging an apparently authentic message. Thus, even if an adversary can observe the message that includes $H_{99}$, and was capable of sending a different message that includes $H_{99}$, the receiving device 102 would have received the intended message that includes $H_{99}$ from the sending device 100, and will be looking, in effect, for $H_{98}$ in the next authentic message.

There are many variations possible in the use of the above mechanism. For example, if the receiving device 102 can learn that the initial $H_{100}$ is from the sending device 100 in a secure way, then this can, for example, be used as a password mechanism, possibly authenticating sessions rather than messages. In addition, although the above example describes the receiving device 102 as a single entity, the messages from the sending device 100 could be sent to a group of receivers or even be a sequence of public messages. Additionally, it would also be possible for the receiving device 102 to also include a similar token in messages to the sending device 100 to verify messages sent by the receiving device 102, resulting in mutual or two-way authentication. The number of times the hash function is applied for the first token sent in the first message could be any number. Although, one hundred was used in the example above, the hash function could be applied two times, three times, ten times, one thousand times, or any other number. In some embodiments, if the initial seed S is the same size as the output of the hash function, the first application of Hash can be skipped, and S can be used directly as $H_1$. When a token is received in a message and authenticates that message, that token could be repeated in a response to, or acknowledgement of the message, as a proof of receipt.

In some embodiments, it is possible to compensate for a number of messages being lost or blocked in the network by having the receiver try multiple applications of the hash function. For example, assume the sending device 100 in its first message sends $H_{100}$ as the hash token, then in its second message sends $H_{99}$, and in its third message sends $H_{98}$. In the event that the second message that includes $H_{99}$ as the hash token is lost in the network, the receiving device 102 receives the first message and remembers $H_{100}$, never receives the second message, and then receives the third message with $H_{98}$ as the hash token. When the receiving device 102 checks the hash token in the third message (which is the second message the receiving device 102 receives) by applying the hash function, the check will fail because the $H_{100}$ value the receiving device 102 has saved does not equal the hash of the hash token in the third message (Hash($H_{98}$)). In some embodiments, to compensate for a single lost message, if the initial check by the receiving device 102 fails, as in this example, the receiving device 102 could then try applying the hash function twice to the hash token in the received message (Hash(Hash($H_{98}$))). Doing so, the receiving device 102 would determine that the result matches its saved value of $H_{100}$. In general, to compensate for up to M lost messages, the receiving device 102 would need to apply the hash function to the received token once and if the result does not equal its stored value, apply hash twice and if that result fails, apply hash thrice, etc., up to applying the hash function M times. The value of M could be preconfigured, pre-negotiated, or part of a standard for exchanging messages between the sending device 100 and the receiving device 102. When the sending device 100 runs out of values by sending $H_1$, the process as described initially above would need to repeat with the sending device 100 picking a new seed S' and recursively applying the hash function to the new seed S'.

In some embodiments, the security of the authentication provided may be improved by having parts of the path over which the messages with tokens in them are sent integrity checked and/or encrypted, particularly any parts of the path with a significant probability of message tampering. In some embodiments, to avoid some memory and/or computational burdens, the sender may include more than one hash token in a message where at least two of those tokens are different numbers of generations from their seed value.

As referenced herein, a generation is an application of the hash function. For example, a first-generation means that the hash function has been applied once to obtain a hash value, a second-generation means that the hash function has been applied twice to obtain a second-generation hash value (e.g., a hash of the first-generation hash value produces a second-generation hash value), a J-generation means the hash function has been applied J times to obtain a J-generation hash value, where J is an integer value greater than one. Similarly, a K-generation means the hash function has been applied K times to obtain a K-generation hash value, where K is an integer value greater than one. In some embodiments, the integer values of J and K can be the same value or can be different values.

As described above, receivers of a message stream with hash chain tokens as above can determine the messages are from the same sender if no adversary can intercept or block a message and steal the token(s) from the message to falsely authenticate a forged message. However, an adversary can forge an apparently authentic message if the adversary can intercept a message in a hash chained sequence and steal the hash token(s) from that message. Another security weakness is that a sender has no assurance that messages the sender is sending with hash chaining are received correctly. Even if hash tokens are echoed back in responses and both parties are using hash tokens, this process only indicates that a message containing the hash token was received, but the message still might still have been modified in transit by an adversary.

To address the above issues, and other issues, the present disclosure describes various systems and methods that improve hash chain security for communicating messages. In particular, the disclosed embodiments combine the hash of a previous message or messages into a hash chain token in a reversible manner, which reveals little to no information about the combined quantities individually, to provide stronger communication assurances. The hash chain token can be reversibly separated into the previous combined components to determine whether a received message was sent by the same sender of a previous message, and whether the previous message was received completely and unaltered. By changing how the hash token in a message is computed, an adversary can be stopped from forging apparently authentic messages unless the adversary has received the previous message or some number of previous messages up to all previous messages in the sequence.

Figure 2:
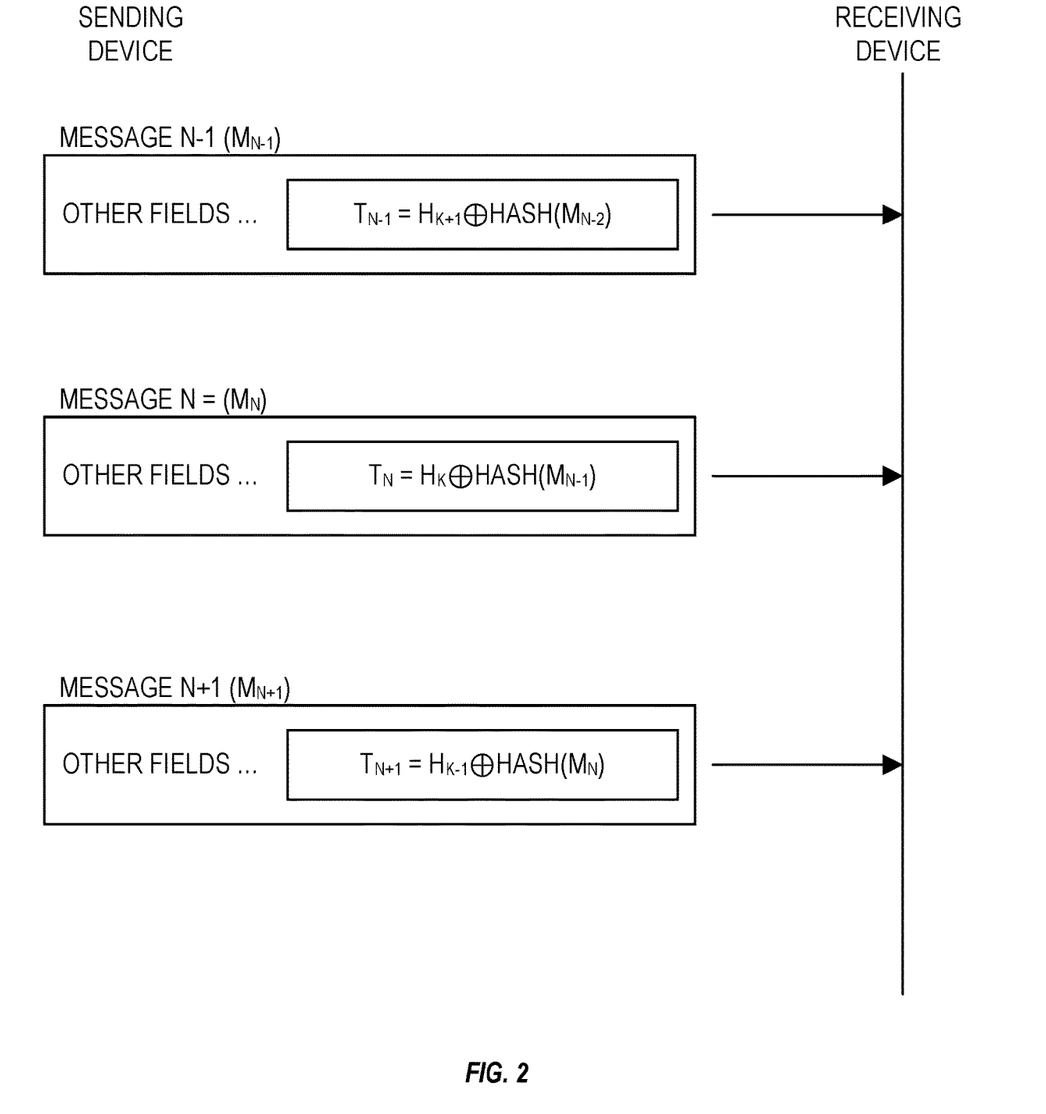
FIG. 2 illustrates an improved hash chaining security process for a series of messages of a one-way message stream in accordance with an embodiment of the present disclosure.

For example, FIG. 2 illustrates an improved hash chaining security process for a series of messages of a one-way message stream sent by a sending device to one or more receiving devices in accordance with a disclosed embodiment of the present disclosure. The sending device combines the hash of the previous message sent in a reversible manner into the hash token in the current message. Thus, a message cannot be verified or forged without knowledge of the previous message requiring an adversary to intercept two sequential messages. A receiving device can use a stored hash of the previous message or the previous message, if its hash is not stored, to determine whether a received message was sent by the same sender of a previous message, and whether the previous message was received completely and unaltered.

As an example, in FIG. 2, as part of a one-way message stream, the sending device sends a message N−1 ($M_{N-1}$), where N represents an arbitrary integer value. For example, N could be 100. Thus, message N−1 would be the $99^{th}$ message sent by the sending device in the one-way message stream. In the depicted embodiment, the message $M_{N-1}$ includes a hash token ($T_{N-1}$). The hash token is generated by performing a reversible combination, such as a bitwise exclusive-or (XOR) Boolean function (represented by the symbol $\oplus$ and also known as bitwise addition without carry), that combines a particular hash chain value of a seed known only to the sending device and a hash of the last/previous message in the one-way message stream. XOR is a logical operator which results true (i.e., 1) when one operand is true and the other operand is false, otherwise the result is false (i.e., 0). For instance, 0 XOR 0 is 0, 0 XOR 1 is 1, 1 XOR 0 is 1, and 1 XOR 1 is 0. The XOR operation is reversible because the inverse of XOR is XOR. That is if $C=A\oplus B$, then $A=C\oplus B$ and $B=C\oplus A$. Thus, A can be determined if B and C are known, and B can be determined is A and C are known. However, C provides little to no information to the values A or B if neither value is known. Thus, an adversary having acquired the C value would not be able to decipher A or B without previous knowledge of A or B.

As described below, the receiving device stores the previous generation hash value and can store a hash of the previous message (or the actual prior message itself), which can be used to reverse the reversible combination hash token in a message to determine whether the message was received from the same sender as the prior message (based on hashing the previous generation hash value) and determine whether the prior message was received complete and unaltered (based on a comparison of the hash of the previous message).

Although the depicted embodiments use the XOR operation/function for creating a reversible combination of a hash chain value and a hash of the previous message, the disclosed embodiments may use other reversible operations such as, but not limited to, a bitwise negation of XOR (commonly called "equivalence" (EQV) operation). The bitwise negation of XOR is the logical biconditional, which yields true if and only if the two inputs are the same. Other reversible combination function could include bit-wire rotations of either or both quantities being combined by XOR or EQV or rotation of the output. Also, the hash of the previous message could be used by the sender as a key to encrypt the hash chain token and to decrypt the combined token by the receiver. Or, as would be readily apparent to anyone skilled in the art, any combination of these or other reversible combination methods.

As shown in FIG. 2, in message $M_{N-1}$, the hash chain value is $H_{K+1}$, which is the K+1 generation hash of a seed. K can be any integer value greater than one. For example, if K is 10, then $H_{K+1}$ is the $11^{th}$ generation hash chain value of the seed. The hash chain value of $H_{K+1}$ is combined using XOR with the hash of the prior message sent by the sending device (Hash($M_{N-2}$)) to generate a hash token $T_{N-1}$ that is included in the message $M_{N-1}$.

Then, in the next message (message $M_N$) in a one-way message stream, the sending device includes a hash token $T_N$ that is a reversible combination of the next lower hash chain value ($H_K$) and a hash of the previous message (Hash($M_{N-1}$)). For instance, if K is 10 as stated above, the prior message $M_{N-1}$ had the $11^{th}$-generation hash value of the seed, and the current message $M_N$ uses the $10^{th}$-generation hash value of the seed. The hash chain value enables the receiving device to verify that the message is from the same sending device that sent the prior message as described in FIG. 1. The hash of the previous message (Hash($M_{N-1}$)) reversibly included in the hash token $T_N$ can be used by the receiving device to verify that prior message was received complete and unaltered. For example, in an embodiment, after receiving message $M_{N-1}$, the receiving device hashes message $M_{N-1}$ and stores the hash value, as well as the value of $H_{K+1}$ from $T_{N-1}$. When the receiving device receives the message $M_N$, the receiving device can reverse the combination in the hash token $T_N$ of the message $M_N$ by using the saved quantity Hash($M_{N-1}$) and compare the hash of the revealed hash chain token against the save $H_{N_1}$ to determine whether the receiving device received message $M_{N-1}$ completely and unaltered, and whether message $M_N$ was sent by the same sending device that sent message $M_{N-1}$. Thus, the receiving device can undo the reversible combination by using the hash of the previous message and then tests the revealed hash in the current message against the saved hash chain value from the previous message by hashing this revealed hash and comparing. This one test simultaneously authenticates that the current message is from the current sender and that the previous message was correctly received. The receiving device then saves this revealed hash chain value from the current message and either (1) the current message or (2) the hash of the current message. With these two saved values, the receiving device is all set to process the next message.

For instance, in an embodiment, when the receiving device receives the message $M_N$, the receiving device can authenticate message $M_N$ by extracting $H_K$ from $H_K \oplus$Hash($M_{N-1}$) using Hash($M_{N-1}$), comparing this with the value of $H_{K+1}$ from $M_{N-1}$ as previously extracted from $T_{N-1}$. If the Hash($H_K$) is equal to the value of $H_{K+1}$ from $T_{N-1}$ then message $M_N$ is authenticated as being sent by the same sending device that sent message $M_{N-1}$, and further authenticates that message $M_{N-1}$ was received complete and unaltered. To successfully forge message $M_N$, an adversary must not only steal $H_{K+1}$ to use in producing the forged message, but must also have access to or control over message $M_{N-1}$. Thus, the disclosed embodiments increase or improve communication security by making message hijacking more difficult.

Similarly, in the next message $M_{N+1}$, the sending device includes a hash token that is a reversible combination of the next lower hash chain value ($H_{K-1}$) and a hash of the previous message (Hash($M_N$)), which can be used by the receiving device to verify whether message $M_{N+1}$ was sent by the same sending device that sent message $M_N$ and whether message $M_N$ was received complete and unaltered by the receiving device.

Figure 3:
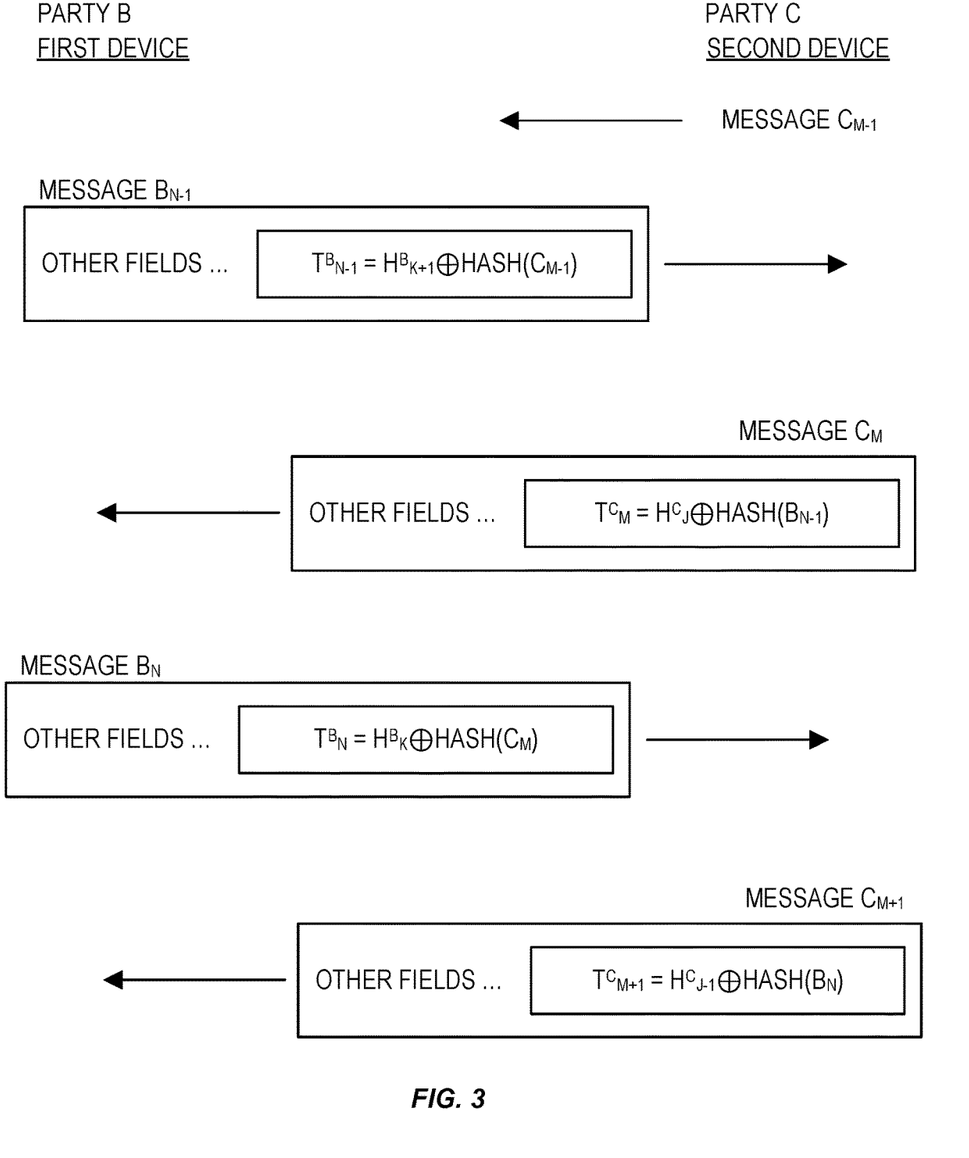
FIG. 3 illustrates an improved hash chaining security process for a series of messages of a two-way message stream in accordance with an embodiment of the present disclosure.

The disclosed embodiments can also apply to a two-way message stream. For example, assuming two parties, party B and party C are communicating. Hash chain techniques can be extended to provide mutual authentication and evidence of receipt to resist adversaries unless those adversaries have access to the messages in both directions between party B and party C. In cases where the messages from party B to party C and those from party C to party B follow different paths, it may be particularly difficult for an adversary to gain access to both flows. As an example, FIG. 3 illustrates an improved hash chaining security process for a series of messages of a two-way message stream between a first device (party B) and a second device (party C) in accordance with a disclosed embodiment of the present disclosure. A non-limiting example of a two-way conversation is a request-response system, with both parties using hash tokens for authentication. In the depicted embodiment, both parties combine the hash of their most recently received message. Verification of the other party's hash token indicates correct receipt by that other party of the last message sent to them. For instance, as shown in FIG. 3, assume party C sends message $C_{M-1}$ to party B. In an embodiment, party C stores a hash of message $C_{M-1}$. In response to message $C_{M-1}$, party B sends message $B_{N-1}$ to party C. Party B includes hash token $T^B_{N-1}$ in the message $B_{N-1}$. Party B stores a hash of message $B_{N-1}$ for authenticating the next message received by party B. $T^B_{N-1}$ represents the hash token of message $B_{N-1}$. $T^B_{N-1}$ is computed as $T^B_{N-1} = H^B_{K+1} \oplus$Hash($C_{M-1}$). $H^B_{K+1}$ is the K+1 generation hash value of seed B. Hash($C_{M-1}$) is the hash of the message $C_{M-1}$ that was received by party B. When party C receives message $B_{N-1}$ from party B, party C can recover $H^B_{K+2}$ from the hash token $T^B_{N-1}$ using saved Hash($C_{M-1}$) and determine whether message $B_{N-1}$ was sent from same sender that sent the last message received by party C ($B_{N-2}$, not shown) and whether party B received message $C_{M-1}$ completely and unaltered and the stored $H^B_{K+2}$ recovered from the last message received by party C. As described above, if the hash of message $C_{M-1}$ used to calculate $T^B_{N-1}$ is equal to the stored hash of message $C_{M-1}$, then party B received message $C_{M-1}$ completely and unaltered, and if the hash of $H^B_{K+1}$ is equal to the stored value of $H^B_{K+2}$, then message $B_{N-1}$ was sent by the same sender that sent the last message received by party C (not shown).

After receiving message $B_{N-1}$, party C responds with message $C_M$ including hash token $T^C_M$ computed as $T^C_M = H^C_J \oplus$Hash($B_{N-1}$). Party B receives message $C_M$ and reverses the $T^C_M$ to determine whether message $C_M$ was sent by the same sender that sent message $C_{M-1}$ and whether party C received message $B_{N-1}$ completely and unaltered using the stored hash of message $B_{N-1}$ and the stored value $H^C_{J+1}$ reversibly combined into message $C_{M-1}$ (not shown). When the Hash($B_{N-1}$) combined into $T^C_M$ is equal to the stored hash of message $B_{N-1}$, then party C received message $B_{N-1}$ completely and unaltered, and when the hash of $H^C_J$ is equal to the stored value of $H^C_{J+1}$, then message $C_M$ was sent by the same sender that sent message $C_{M-1}$.

The two-way communication continues with Party B, in its next message to C, namely message $B_N$, including hash token $T^B_N$ computed as $T^B_N = H^B_K \oplus$Hash($C_M$). As described above, receipt of message $B_N$ and verification of $H^B_K$ by Party C implies that $B_N$ is from the same entity that sent message $B_{N-1}$ and that message $C_M$ was correctly received by Party B. Similarly, receipt of message $C_{M+1}$ and verification of $H^C_{J-1}$ by Party B implies that message $C_{M+1}$ is from the same sender that sent message $C_M$ and that message $B_N$ was correctly received by Party C. Continuing in this fashion, each party can authenticate the messages the party receives and the correct receipt of the preceding message that the party sent.

As stated above, the combining function used to produce the hash tokens from a hash chain value and the hash of a message could be some other function rather than XOR provided the operation reversibly combines the two values so that little to no information is revealed about either value individually. In some embodiments, Party B and Party C can save the most recent message received from the other or save the hash of that message and the hash sent in the hash token in that message.

In some embodiments, Party B and Party C can initially trust the first message received from the other (e.g., trust on first use (TOFU)) or the initial hash values ($H^B_N$ and $H^C_M$) could be communicated or $H^B_N$ and $H^C_M$ could be secured in some manner such as manual configuration or through a communication protocol. In addition, the initial message from Party B could be sent to multiple potential correspondents (party D, party E, and party F) and then different subsequent message exchange sequences held with each correspondent that responds.

In some embodiments, messages could contain two or more hash tokens, in which case the previously sent message should be combined with the token to be used for authentication or with that token and with any hash token to be used for future authentication. Multiple hash tokens could be included with the same hash function using different seeds or different hash functions from each other.

In some embodiments, when computing a hash token, in addition to combining the most recently received message, the most recently sent message could also be included. So, in the example above, $T^C_M$ could be computed as $T^C_M$=Hash $(C_{M-1}) \oplus H^C_f \oplus \text{Hash}(B_{N-1})$ or even more of the earlier messages could be combined.

One skilled in the art would understand how to combine any or all of the above embodiments in a variety of permutations and combinations. Many other embodiments are possible as will be apparent to someone skilled in the art.

Figure 4:
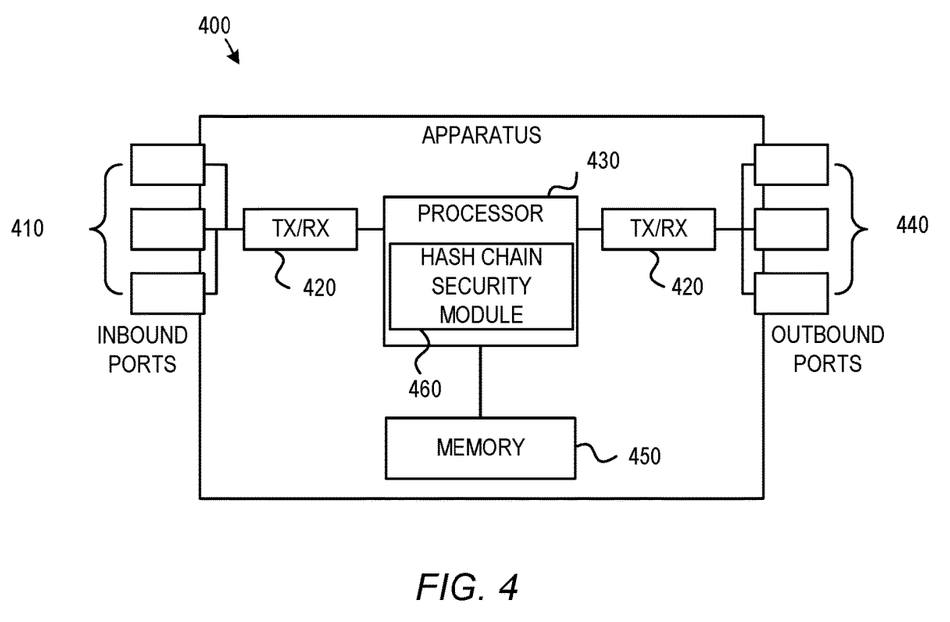
FIG. 4 is a schematic diagram of an apparatus configured to implement one or more of the methods disclosed herein according to an embodiment of the disclosure.

FIG. 4 is a schematic diagram of an apparatus 400 configured to implement one or more of the methods disclosed herein according to an embodiment of the disclosure. For example, the apparatus 400 may represent the sending device 100 and/or the receiving device 102. The apparatus 400 comprises ingress ports 410 and receiver units (Rx) 420 for receiving messages, one or more processors, logic unit, or central processing unit (CPU) 430 to process the messages, transmitter units (TX) 420 and egress ports 440 for transmitting the messages, and a memory 450.

The processor 430 is implemented by any suitable combination of hardware, middleware, and firmware. The one or more processors 430 may be implemented as one or more CPU chips, cores (e.g., as a multi-core processor), field-programmable gate arrays (FPGAs), application specific integrated circuits (ASICs), or digital signal processors (DSPs). The one or more processors 430 is in communication with the ingress ports 410, receiver units 420, transmitter units 420, egress ports 440, and memory 450.

The memory 450 comprises one or more disks, tape drives, or solid-state drives and may be used as an over-flow data storage device, to store programs when such programs are selected for execution, or to store instructions and data that are read during program execution. The memory 450 may be volatile and/or non-volatile and may be read-only memory (ROM), random-access memory (RAM), ternary content-addressable memory (TCAM), or static random-access memory (SRAM). In one embodiment, the memory 450 comprises a hash chain security module 460. The hash chain security module 460 comprises executable instructions and data configurations that when executed by the one or more processors 430 implements the disclosed embodiments as described herein.

While several embodiments have been provided in the present disclosure, it should be understood that the disclosed systems and methods might be embodied in many other specific forms without departing from the spirit or scope of the present disclosure. A person skilled in the art would understand how to combine any or all of the above techniques in a vast variety of permutations and combinations.

The present examples are to be considered as illustrative and not restrictive, and the intention is not to be limited to the details given herein. For example, the various elements or components may be combined or integrated in another system or certain features may be omitted, or not implemented.

These disclosed embodiments improve the security of hash chaining by providing assurances of receipt by the other party in both one-way communications and in a two-way conversation of previous messages. In particular, the reversible combining of the hash of one or more previous messages into the hash chaining hash token of the message to be transmitted in a manner that reveals little to no information about the quantities combined enables both hash chain verification of the hash token to authenticate a sender of a message as well authenticate receipt of one or more earlier messages. Use of the disclosed embodiments provide improved security by requiring an adversary to intercept earlier messages in order to be able to forge an apparently authentic message.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for improving communication security implemented by a first device, the method comprising:
   receiving a first message ($M_N$) that includes a first hash token based on a K generation hash ($H_K$) value of a seed, wherein K is an integer value greater than one;
   storing the $H_K$ value and at least one of the first message ($M_N$) or a hash of the first message ($H(M_N)$);
   receiving a second message ($M_{N+1}$) that includes a second hash token based on a first reversible combination of a K−1 generation hash ($H_{K-1}$) value of the seed and the hash of the first message ($H(M_N)$);
   reversing the first reversible combination using the stored first message ($M_N$) or the stored hash of the first message ($H(M_N)$) to determine the K−1 generation hash ($H_{K-1}$) value from the second hash token;
   determining whether a hash value of the hash of the K−1 generation hash ($H_{K-1}$) value ($H(H_{K-1})$) is equal to the $H_K$ value; and
   authenticating the second message ($M_{N+1}$) was from a second device that sent the first message ($M_N$) and that the first message ($M_N$) was received complete and unaltered when the hash value of the K−1 generation hash ($H_{K-1}$) value ($H(H_{K-1})$) is equal to the $H_K$ value.

2. The method of claim 1, further comprising discarding the second message ($M_{N+1}$) when the hash value of the K−1 generation hash ($H_{K-1}$) value ($H(H_{K-1})$) is not equal to the $H_K$ value.

3. The method of claim 1, wherein determining the K−1 generation hash ($H_{K-1}$) value from the second hash token comprises:
   retrieving the stored hash of the first message ($M_N$) or hashing the stored first message ($M_N$) that was received by the first device; and
   performing an exclusive-or (XOR) operation between the stored hash of the first message ($M_N$) or a hash of the stored first message ($M_N$) and the second hash token to determine the K−1 generation hash ($H_{K-1}$) value from the second hash token.

4. The method of claim 1, further comprising receiving a third message ($M_{N+2}$) that includes a third hash token based on a second reversible combination of a K−2 generation hash ($H_{K-2}$) value of the seed and a hash of the second message ($M_{N+1}$).

5. The method of claim 4, further comprising:
determining the K−2 generation hash ($H_{K-2}$) value from the third hash token;
determining whether a hash value of the hash of the K−2 generation hash ($H_{K-2}$) value ($H(H_{K-2})$) is equal to the K−1 generation hash ($H_{K-1}$) value; and
authenticating the third message ($M_{N+2}$) was from the second device that sent the second message ($M_{N+1}$) and that the second message ($M_{N+1}$) was received complete and unaltered when the hash value of the K−2 generation hash ($H_{K-2}$) value ($H(H_{K-2})$) is equal to the K−1 generation hash ($H_{K-1}$) value.

6. The method of claim 5, further comprising verifying the second message ($M_{N+1}$) was received complete and unaltered when the hash of the second message ($M_{N+1}$) received by the first device is equal to the hash of the second message ($M_{N+1}$) in the third message ($M_{N+2}$).

7. A method for improving communication security implemented by a first device, the method comprising:
receiving a first incoming message from a second device, wherein the first incoming message includes a first incoming hash token comprising a first reversible combination of a J+1 generation hash ($H_{J+1}$) value of a first seed known only to the second device and a hash of any last outgoing message from the first device, wherein J is an integer value greater than one;
generating a first outgoing hash token based on a second reversible combination of a K+1 generation hash ($H_{K+1}$) value of a second seed known only to the first device and a hash of the first incoming message, wherein K is an integer value greater than one; and
sending a first outgoing message that includes the first outgoing hash token to the second device.

8. The method of claim 7, further comprising:
determining the J+1 generation hash ($H_{J+1}$) value of the first seed from the first incoming hash token; and
storing the J+1 generation hash ($H_{J+1}$) value for use in authenticating a second incoming message from the second device.

9. The method of claim 8, further comprising receiving the second incoming message from the second device, wherein the second incoming message includes a second incoming hash token based on a third reversible combination of a J generation hash ($H_J$) value of the first seed and the hash of the first outgoing message.

10. The method of claim 9, further comprising:
determining the J generation hash ($H_J$) value from the second incoming hash token;
determining whether a hash value of the J generation hash ($H_J$) value is equal to the $H_{J+1}$ value; and
authenticating the second incoming message was from the second device and that the first outgoing message was received complete and unaltered by the second device when the hash value of the J generation hash ($H_J$) value is equal to the $H_{J+1}$ value.

11. An apparatus configured to improve communication security, the apparatus comprising:

a memory configured to store instructions; and
one or more processors coupled to the memory and configured to execute the instructions to cause the apparatus to:
receive a first message ($M_N$) that includes a first hash token based on a K generation hash ($H_K$) value of a seed, wherein K is an integer value greater than one;
store the $H_K$ value and at least one of the first message ($M_N$) or a hash of the first message ($H(M_N)$);
receive a second message ($M_{N+1}$) that includes a second hash token based on a first reversible combination of a K−1 generation hash ($H_{K-1}$) value of the seed and the hash of the first message;
reverse the first reversible combination using the stored first message ($M_N$) or the stored hash of the first message ($H(M_N)$) to determine the K−1 generation hash ($H_{K-1}$) value from the second hash token;
determine whether a hash value of the hash of the K−1 generation hash ($H_{K-1}$) value ($H(H_{K-1})$) is equal to the $H_K$ value; and
authenticate the second message ($M_{N+1}$) was from a second device that sent the first message ($M_N$) and that the first message ($M_N$) was received complete and unaltered when the hash value of the K−1 generation hash ($H_{K-1}$) value ($H(H_{K-1})$) is equal to the $H_K$ value.

12. The apparatus of claim 11, wherein the one or more processors are further configured to execute the instructions to cause the apparatus to discard the second message ($M_{N+1}$) when the hash value of the K−1 generation hash ($H_{K-1}$) value ($H(H_{K-1})$) is not equal to the $H_K$ value.

13. The apparatus of claim 11, wherein the one or more processors are further configured to execute the instructions to cause the apparatus to:
retrieve the stored hash of the first message ($M_N$) or hashing the stored first message ($M_N$) that was received by the apparatus; and
perform an exclusive-or (XOR) operation between the stored hash of the first message ($M_N$) or a hash of the stored first message ($M_N$) and the second hash token to determine the K−1 generation hash ($H_{K-1}$) value from the second hash token.

14. The apparatus of claim 11, wherein the one or more processors are further configured to execute the instructions to cause the apparatus to receive a third message ($M_{N+2}$) that includes a third hash token based on a second reversible combination of a K−2 generation hash ($H_{K-2}$) value of the seed and a hash of the second message ($M_{N+1}$).

15. The apparatus of claim 14, wherein the one or more processors are further configured to execute the instructions to cause the apparatus to:
determine the K−2 generation hash ($H_{K-2}$) value from the third hash token;
determine whether a hash value of the hash of the K−2 generation hash ($H_{K-2}$) value ($H(H_{K-2})$) is equal to the K−1 generation hash ($H_{K-1}$) value; and
authenticate the third message ($M_{N+2}$) was from the second device that sent the second message ($M_{N+1}$) and that the second message ($M_{N+1}$) was received complete and unaltered when the hash value of the K−2 generation hash ($H_{K-2}$) value ($H(H_{K-2})$) is equal to the K−1 generation hash ($H_{K-1}$) value.

16. The apparatus of claim 15, wherein the one or more processors are further configured to execute the instructions to cause the apparatus to verify the second message ($M_{N+1}$) was received complete and unaltered when the hash of the second message ($M_{N+1}$) received by the apparatus is equal to the hash of the second message ($M_{N+1}$) in the third message ($M_{N+2}$).

17. A computer program product comprising computer-executable instructions stored on a non-transitory computer-readable storage medium, the computer-executable instructions when executed by one or more processors of an apparatus, cause the apparatus to:
  receive a first incoming message from a device, wherein the first incoming message includes a first incoming hash token comprising a first reversible combination of a J+1 generation hash ($H_{J+1}$) value of a first seed known only to a sender of the first incoming message and a hash of any last outgoing message from the apparatus, wherein J is an integer value greater than one;
  generate a first outgoing hash token based on a second reversible combination of a K+1 generation hash ($H_{K+1}$) value of a second seed known only to the apparatus and a hash of the first incoming message, wherein K is an integer value greater than one; and
  send a first outgoing message that includes the first outgoing hash token to the device.

18. The computer program product of claim 17, wherein the instructions when executed by the one or more processors, further causes the apparatus to:
  determine the J+1 generation hash ($H_{J+1}$) value of the first seed from the first incoming hash token; and
  store the J+1 generation hash ($H_{J+1}$) value for use in authenticating a second incoming message from the device.

19. The computer program product of claim 18, wherein the instructions when executed by the one or more processors, further causes the apparatus to receive the second incoming message from the device, wherein the second incoming message includes a second incoming hash token based on a third reversible combination of a J generation hash ($H_J$) value of the first seed and the hash of the first outgoing message.

20. The computer program product of claim 19, wherein the instructions when executed by the one or more processors, further causes the apparatus to:
  determine the J generation hash ($H_J$) value from the second incoming hash token;
  determine whether a hash value of the J generation hash ($H_J$) value is equal to the $H_{J+1}$ value; and
  authenticate the second incoming message was from the device and that the first outgoing message was received complete and unaltered by the device when the hash value of the J generation hash ($H_J$) value is equal to the $H_{J+1}$ value.

* * * * *

UNITED STATES PATENT AND TRADEMARK OFFICE
CERTIFICATE OF CORRECTION

| | | |
|---|---|---|
| PATENT NO. | : 12,244,745 B2 | Page 1 of 1 |
| APPLICATION NO. | : 18/356741 | |
| DATED | : March 4, 2025 | |
| INVENTOR(S) | : Donald E. Eastlake, III | |

It is certified that error appears in the above-identified patent and that said Letters Patent is hereby corrected as shown below:

On the Title Page (54) Delete "METHOD FOR IMPROVED HASH CHAINING AUTHENTICATION" and insert -- METHOD FOR IMPROVED HASH CHAINING SECURITY --.

In the Specification

Column 1, Lines 1-2, Delete "METHOD FOR IMPROVED HASH CHAINING AUTHENTICATION" and insert -- METHOD FOR IMPROVED HASH CHAINING SECURITY --.

In the Claims

Column 14, Claim 14, Lines 44-49, should read:
14. The apparatus of claim 11, wherein the one or more processors are further configured to execute the instructions to cause the apparatus to receive a third message ($M_{N+2}$) that includes a third hash token based on a second reversible combination of a K-2 generation hash ($H_{K-2}$) value of the seed and a hash of the second message ($M_{N+1}$).

Signed and Sealed this
Fifteenth Day of July, 2025

Coke Morgan Stewart
*Acting Director of the United States Patent and Trademark Office*